UNITED STATES PATENT OFFICE.

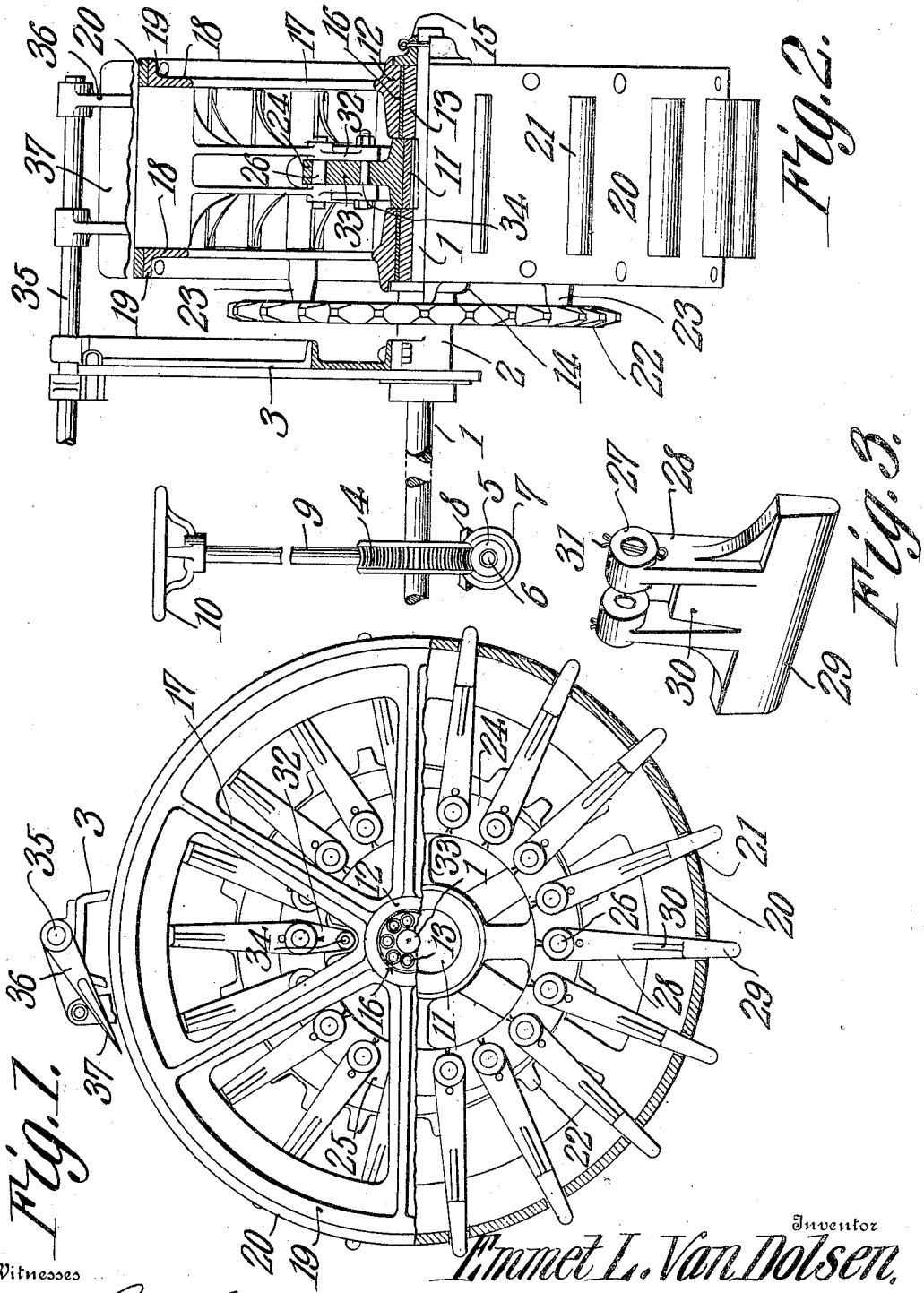

EMMET L. VAN DOLSEN, OF BERWYN, ILLINOIS, ASSIGNOR OF ONE-HALF TO THOMAS J. DOLAN, OF BERWYN, ILLINOIS.

WHEEL FOR TRACTION-ENGINES.

No. 914,324.      Specification of Letters Patent.      Patented March 2, 1909.

Application filed December 16, 1907. Serial No. 406,716.

*To all whom it may concern:*

Be it known that I, EMMET L. VAN DOLSEN, a citizen of the United States, residing at Berwyn, in the county of Cook and State of Illinois, have invented a new and useful Wheel for Traction-Engines, of which the following is a specification.

This invention relates to wheels for traction engines and its object is to provide a wheel of this character having adjustable spuds which can be shifted so as to adapt the wheel for use upon roads of different kinds and conditions, it being possible to entirely retract the spuds into the lowermost portion of the wheel so as to present a smooth surface to the road.

Another object is to provide a wheel of this character designed to automatically clear itself of all dirt or other accumulations upon the rim thereof, the spuds acting thereon in such a manner as to thoroughly loosen it from the rim.

Another object is to provide means for scraping the tread of the wheel.

Another object is to provide a wheel constructed in a novel manner the various parts of which can be conveniently replaced in the event of wear or breakage.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a view partly in side elevation and partly in section of a wheel embodying the present improvements. Fig. 2 is an elevation of a portion of the tread, the upper portion of the wheel being shown in transverse section. Fig. 3 is a detail view of one of the spuds detached.

Referring to the figures by characters of reference, 1 designates an axle preferably journaled within a sleeve 2 secured to the frame 3 of the structure of the traction engine and this axle has a worm gear 4 keyed or otherwise secured to it and driven by a worm 5 mounted on a shaft 6 to which a gear 7 is also secured. This gear is disposed to be actuated by a gear 8 secured to a shaft 9 having a hand wheel 10 or other suitable means whereby the same can be conveniently actuated by the operator. Axle 1 extends beyond the sleeve 2 and keyed or otherwise secured to this projecting portion of the axle is an eccentric 11. Hub sections 12 are arranged upon the axle at opposite sides of the eccentric and a series of anti-friction rollers 13 is preferably located between the axle and the hub. The hubs are held against movement longitudinal to the axle by means of a collar 14 formed upon the sleeve 2 and by a cap 15 which is fastened to the axle in any suitable manner, as by means of a cotter pin. A wear sleeve or bushing 16 is preferably located within each hub for contact with the rollers. Each hub 12 has spokes 17 radiating therefrom and connected to or formed with a ring 18 having an outwardly extending annular flange 19. Secured upon the two flanges 19 is a metal band 20 constituting the tread of the wheel and this band is provided at regular intervals with transverse slots 21 extending preferably from one ring 18 to the other. This band, together with the ring, spokes, and hubs constitutes the body of the wheel. A drive sprocket 22 is mounted to rotate upon the sleeve 2 and is connected to certain of the spokes of the inner ring 18 by means of studs 23 or in any other desired manner.

Mounted upon the eccentric 11 and between the hubs 12 is a wheel 24 having a flat rim 25 provided at regular intervals with apertures for the reception of pivot pins 26. These pins equal in number the slots 21 and each extends through sleeves 27 formed at the ends of arms 28 extending from a blade 29 forming a spud. The arms and blade are preferably reinforced by means of webs 30 as shown particularly in Fig. 3. The arms 28 straddle rim 25 and are designed to oscillate upon their pivot pins 26, said pins being held against displacement within sleeves 27 in any preferred manner as by means of cotter pins 31. Each spud is designed to extend loosely through one of the slots 21. The arms 28 of one of the spuds have extensions 32 which extend along opposite faces of one of the spokes 33 of wheel 24 and these extensions are bolted to the spoke as indicated at 34 so as to hold the arms 28 of said spud in fixed relation to the wheel 24. The other spuds, however, are pivotally connected to the wheel as heretofore stated.

A rock bar 35 is journaled upon the structure 3 and has hangers 36 secured to it at points above the traction wheel, and these hangers are connected by a scraping blade 37 designed to extend the entire width of the traction wheel and to rest upon the tread thereof. Any suitable means, not shown, may be employed for actuating the rock bar so as to move the scraper into or out of contact with the wheel.

When it is desired to project the spuds as far as possible into the ground, as for example, when the ground is very soft and when considerable tractive power is desired axle 1 is turned by means of the shaft 9 and the gears operated thereby until the eccentric 11 is turned downward as far as possible. This will throw the wheel 24 downward and cause the lowermost spuds to be projected beyond the tread of the wheel, while the uppermost spuds will be retracted into the wheel as indicated in Fig. 1. As the eccentric 11 remains stationary it will be apparent that as the traction wheel revolves the spuds will be successively projected beyond the tread 20 as they move downward during the rotation of the wheel and after they pass the lowermost portion of the wheel they will be gradually retracted during their upward movement. This results in a slight oscillatory action of each spud which serves during the upward movement of the spud to thoroughly loosen any dirt or other accumulations upon the spud and adjacent portion of the tread thereby preventing dirt, etc., from being drawn into the wheel by the spud. By placing the scraper in contact with the tread at the point where the spuds are retracted all dirt, etc., can be quickly removed from the tread thereby.

Should the ground be hard it would of course be undesirable to project the spuds thereinto for a considerable distance and therefore by partly rotating the eccentric 11 the point of the greatest projection of the spuds can be shifted from the point of contact between the wheel and the ground to a desired distance from said point of contact. When the wheel is traveling over a road which should not be cut by the spuds the point of the greatest projection can be changed to the top of the wheel so that only the smooth tread will be presented to the road.

Great importance is attached to the fact that each spud has a slight oscillating movement during the rotation of the wheel as it serves to press the dirt away from the slot in which the spud is located so as to prevent the same from being drawn into the wheel with the spud. As a result the mechanism of the wheel is kept practically cleaned at all times. It will be seen that the wheel is very simple, durable and efficient and by constructing the parts in the manner described any one or more of them can be readily replaced in the event of wear or breakage. The relatively fixed spud having the extensions 32 is provided to prevent independent rotation of the wheel 24 and the tread 20.

What is claimed is:

1. A traction wheel comprising an axle having an intermediate eccentric portion, means for rotating the axle, hubs upon the axle at opposite sides of the eccentric portion, said axle being mounted to rotate within the hubs, spokes radiating from each hub, rings carried by the spokes of the hubs, a band secured to the rings and constituting the tread of the wheel, said band having transverse slots the ends of which are flush with the inner or adjoining faces of the rings, an inner wheel mounted upon the eccentric portion and shiftable thereby, a series of spuds carried by said wheel, each spud consisting of a blade movably mounted in one of the slots, arms extending from the blade and straddling the peripheral portion of the inner wheel, sleeves upon said arms, pivot pins extending through the sleeves and the inner wheel and held against longitudinal movement therein and webs interposed between the arms and extending from said arms to the end portions of the blade, and means for preventing independent rotation of the inner and outer wheels.

2. A spud for traction wheels comprising a blade having integral parallel arms extending perpendicularly from one edge thereof, each arm having a bearing sleeve at its free end, the two sleeves being disposed in alinement, there being reinforcing webs extending from the arms to the ends of the blade and between the arms.

In testimony that I claim the foregoing as my own, I have hereto affixed my signature in the presence of two witnesses.

EMMET L. VAN DOLSEN.

Witnesses:
J. H. DELANY,
EDGAR G. MISENER.